COMPUTING APPARATUS

Filed Feb. 28, 1957

INVENTOR.
Gerhard Wolf
BY Michael S. Striker
agt.

United States Patent Office 2,955,759

Patented Oct. 11, 1960

2,955,759

COMPUTING APPARATUS

Gerhard Wolf, Munich-Pasing, Germany, assignor to Kienzle Apparate G.m.b.H., Munich-Pasing, Germany Filed Feb. 28, 1957, Ser. No. 643,078

Claims priority, application Germany Feb. 28, 1956

14 Claims. (Cl. 235—173)

The present invention relates to computing apparatus. More particularly, the present invention relates to an accumulator for digital computing apparatus.

In the conventional accumulators which are used with electronic computing devices, it is not possible to shift the result recorded in the accumulator by means of simple shifting mechanisms. This is true regardless of the particular system used by the computing means. That is the computer can use the binary or the decimal system. With accumulators used with a computer set up for a decimal system it is particularly difficult to shift the results in the accumulator.

For example, if magnetic storage drums are used in the computer, in order to shift the results in the accumulator, it is necessary to reproduce the stored quantities in reproducing heads, to store the reproduced quantities in separate storers and to record the recorded quantities anew with different recording heads.

If decimal counting tubes are used and, if for example, in two adjacent decimal tubes, the tens order tube has the digit one and the units order tube has the digit nine, it is necessary to produce an order displacement in both orders, to shift each of the recorded digits by ten steps. At the end of such operation the digit one from the tens order will be shifted into the hundreds order and the nine from the units order will be shifted into the tens order. It would be advantageous if this result could be obtained by simple means rather than by the conventional complicated method of multiplying each of the orders with the numeral 10 or by providing intermediate storing devices.

For the simple method, it would be necessary that the digit one in the tens order be moved into the digit two in the tens order after the first of the ten stepping impulses used for shifting purposes. This same first shifting impulse would simultaneously move the digit nine from the units order into the digit zero in the tens order. It would therefore be necessary for the decimal counting tube to display simultaneously the digits two and zero. It is known that no conventional counting tube can display more than one digit at the same time. That is, these tubes are usually arranged to illuminate one of the ten digits arranged on the reading surface of the tube.

Furthermore, the conventional decimal counting systems cannot be used for the simultaneous or successive shifting of digits from one of the orders into the next order. For example if the digit 7 is to be shifted from the units order into the tens order by means of ten shifting impulses, it is clear that a common shifting device must apply three impulses to the decimal counting tube in the units order and then the remaining seven impulses to the decimal counting tube in the tens order. There is no available common shifting device which can operate the decimal counting tubes in this manner.

The present invention overcomes these disadvantages by providing an arrangement which can shift each of the digits of a multi-order number into the next successive order, respectively, by the use of a plurality of shifting impulses. This is accomplished regardless of the particular computing system used. That is if a decimal computing system is used, the shifting impulses include a series of ten shifting impulses.

It is accordingly an object of the present invention to provide a new and improved accumulator apparatus for computing arrangements.

A second object of the present invention is to provide a new and improved accumulator for use with computing mechanisms, which accumulator permits the simple shifting of single or multi-order numbers from one order to the next order.

Another object of the present invention is to provide a new and improved accumulator for electronic computing machines, which accumulator includes computing elements.

Still another object of the present invention is to provide a new and improved accumulator for computing apparatus wherein a common shifting device is used for simultaneously shifting the various digits of a multi-order number into a new order.

Still a further object of the present invention is to provide an accumulator for computing apparatus wherein a number of shifting impulses are used for simultaneously shifting the multi-order number in the accumulator and wherein the number of such shifting impulses depends upon the particular type of computing system used.

It is yet another object of the present invention to provide a new and improved accumulator for computing apparatus which can be directly connected to a totalizing arrangement for indicating the final results of the computation carried out in the accumulator.

With the above objects in view, the present invention mainly consists of an accumulator arrangement for computing machines including a plurality of storage registers for storing digits corresponding to a multi-order number in the accumulator, the registers being electrically connected in series in a closed ring circuit, means for generating a plurality of shifting impulses, and shifting means responsive to the shifting impulses and connected in circuit with each of the registers for simultaneously shifting the digit stored in each register to an adjacent register so that the entire multi-order number is simultaneously shifted in the accumulator.

In a preferred embodiment of the present invention, a decade system is used so that each of the storage registers is capable of registering any one of ten digits. In addition, ten shifting impulses are provided in series so that each digit from one storage register is shifted through ten steps into a corresponding digit position in an adjacent storage register.

In one embodiment of the present invention, the registers cooperate with multiplying apparatus which carries out the multiplication process by dividing the partial products into right-hand and left-hand components. The components are used for generating an impulse series which series is respectively applied to a corresponding storage register for adding purposes. The registers include electromagnetic members connected in series for the corresponding digits to be stored.

In a further embodiment of the present invention totalizing apparatus is connected in circuit with the various storage registers so that the result of the computing steps can be printed or displayed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 3:
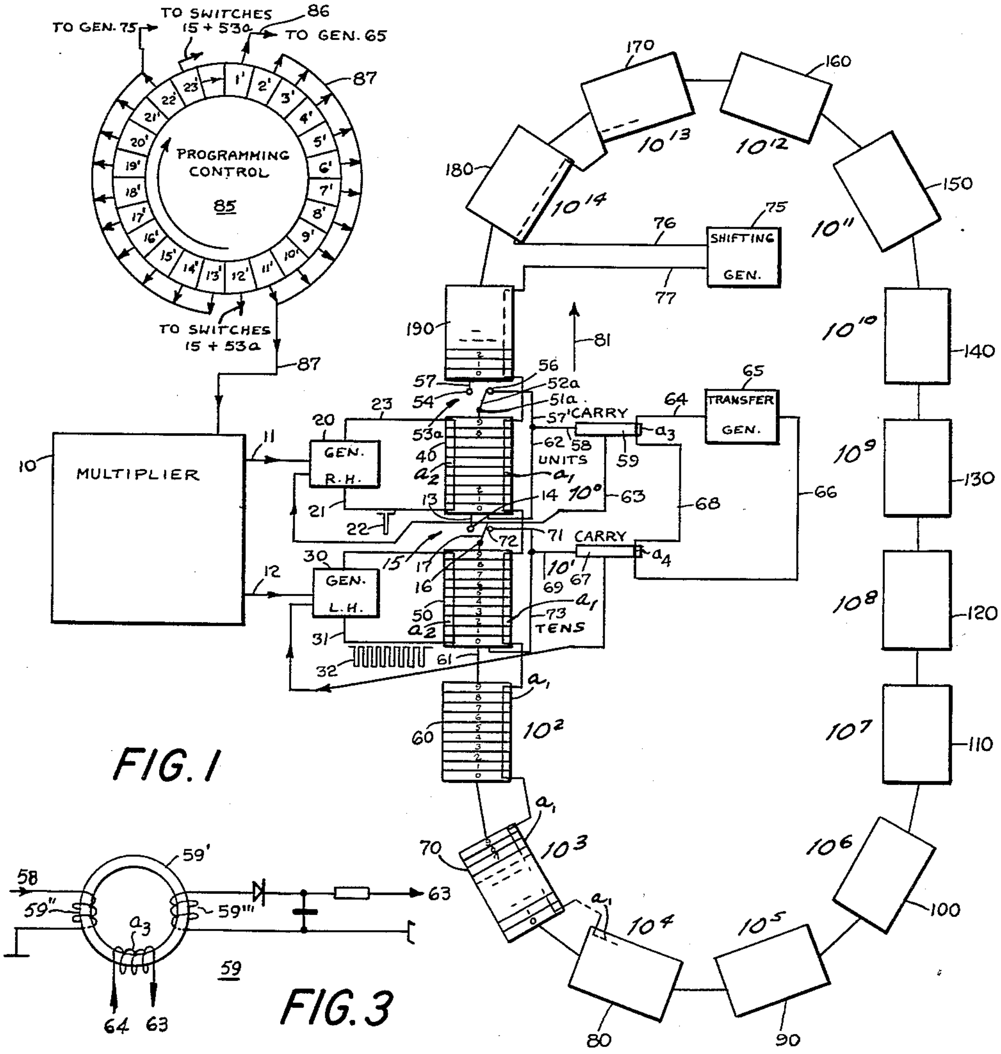
Figure 1 is an electrical schematic diagram of one embodiment of the present invention.
Fig. 3 is a diagrammatic illustration of certain details of one of the "carry" members used in Fig. 1.

Referring to the drawings, and more particularly to Figure 1, it can be seen that the computer is represented by a multiplier 10 e.g. of the type described in the copending application Serial No. 602,164 which is used for multiplying digits of a multiplicand by digits of a multiplier. In the particular illustrated embodiment, the multiplier 10 operates in a conventional manner to form the digits of right-hand components and left-hand components.

Accordingly, appearing on an output conductor 11 of a multiplier 10 is an electrical impulse series which corresponds to the right-hand component of the partial product. Similarly, on an output conductor 12 of a multiplier 10 is an impulse series which corresponds to the left-hand component of the partial product. The conductor 11 is connected to the input of a generator 20 for generating right-hand component signals and the conductor 12 is connected to the input of a generator 30 which is used for generating left-hand component signals.

On an output conductor 21 of the generator 20 is a plurality of negative square-wave impulses. The number of negative impulses corresponds to a particular digit which in turn corresponds to the right-hand component of the partial product produced by the multiplier 10. In Figure 1, one negative digit impulse 22 is illustrated as appearing on the output conductor 21. This negative impulse would correspond to the digit 1.

Similarly, on an output conductor 31 of the generator 30 is a plurality of digit impulses 32 which correspond in number to the left-hand component of the partial product produced in the multiplier 10. In the illustrated example, the number of negative impulses corresponds to the digit 8. The digit impulses 32 are applied to a series-combination of windings $a_2$ of the register 50 in exactly the same manner as digit impulses 22 are applied to a series-combination of windings $a_2$ of register 40, as described further below.

Impulse 22 is applied on the conductor 21 to the storage register 40. Actually, as will be explained subsequently with respect to Figure 2, the digit impulse 22 is applied to a series-combination of windings $a_2$ of the storage register 40.

Figure 2:
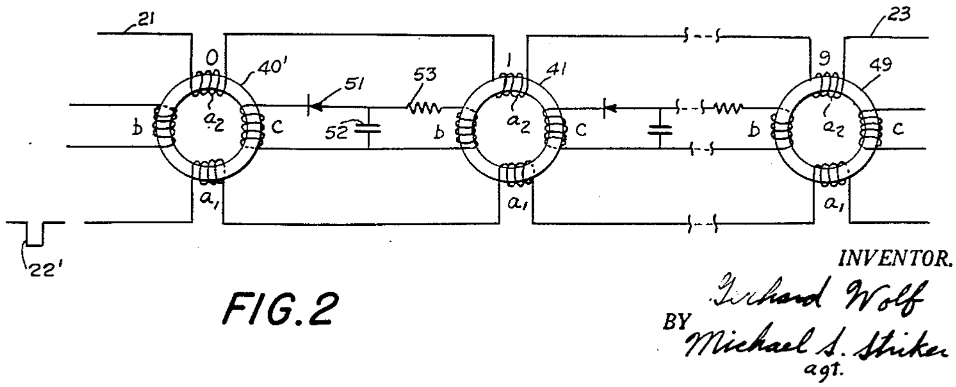
Figure 2 is an electrical schematic diagram of the type of electromagnetic members used in Figure 1.

Referring now to Figure 2, the arrangement of the basic form of an individual storage register will be explained. Each storage register of Figure 1 includes ten electromagnetic annular members, three of which are shown in Figure 2. The magnetic core corresponding to the digit zero has the numeral 40', the core corresponding to the digit 1 is identified by the numeral 41 and the magnetic core corresponding to the digit 9 is identified by the numeral 49.

Each of the magnetic cores 40'–49 is provided with four windings respectively. The winding identified by the letter $a_1$ of each magnetic core is connected in series with the $a_1$ windings of the other nine cores. The same applies to the windings $a_2$. The $b$ windings are the input windings while the $c$ windings are the output windings of each magnetic member 40'–49. It can be seen that each of the output windings $c$ is connected respectively to the input winding $b$ of the next adjacent magnetic member by means of a rectifier 51, a capacitor 52 and a resistor 53.

In operation, there are ten magnetic cores 40'–49 corresponding respectively to the ten digits of the storage register 40. Each of the magnetic members 40'–49 has a substantially rectangular hysteresis loop. When the register has no digit stored therein, the magnetic members 41–49 each have a negative remanent induction while the core 40' has a positive remanent induction.

Accordingly, when a negative shift impulse 22' is applied to the $a_1$ windings in series, it will not affect any of the magnetic cores 41–49. However, in the core 40', an impulse will be produced in the output winding $c$, which impulse will charge the capacitor 52 through the rectifier 51.

After the end of the impulse produced in the output winding $c$, the capacitor 52 will discharge through the resistor 53 and the input winding $b$ of the magnetic core 41 corresponding to the digit 1. At this stage, the magnetic member 40' and the magnetic members 42–49 will all have a negative remanent induction while the magnetic member 41 will have a positive remanent induction. Accordingly, if another negative shift impulse 22' is applied to the $a_1$ windings in series, only the magnetic member 41 will be affected to produce an output impulse in its output windings $c$ for changing the remanent induction of the output core 42 (not shown) from negative to positive while the magnetic core 41 returns to a negative remanent induction.

It is therefore seen that the application of a negative shift impulse will change the remanent induction in only one of the ten magnetic cores 40'–49 from positive to negative and the output impulse produced by this shifting impulse will subsequently change the remanent induction in the next adjacent magnetic core.

It should be apparent that the magnetic members 40'–49 can be arranged so that in the initial state, the magnetic member 40' corresponding to the digit zero has a negative remanent magnetic induction while all the others have positive. In this arrangement, positive impulses would be utilized for producing the required shifting.

With the above arrangement, it therefore can be seen that it is possible to produce a decade register wherein the ten magnetic cores correspond respectively to digits zero–nine and the remanent magnetic induction of a particular magnetic core can be changed to indicate the storage of a particular digit.

Referring again to Figure 1, it can be seen that of all the storage registers 40–190 only the storage registers 40 and 50 actually have two $a$ windings, namely $a_1$ and $a_2$. The series of windings $a_2$ of register 40 described with reference to Fig. 2 is connected at one of its ends to the conductor 21 and is adapted to receive the negative input impulses 22 and the other end of the series of $a_2$ windings is connected on the conductor 23 back to the generator 20 of the right-hand component impulses. Actually, it is apparent that the storage register 40 includes ten magnetic cores 40'–49 each of the cores having a magnetic winding $a_2$ wound thereabout and each of the windings $a_2$ being connected in series between the conductors 21 and 23.

With the above explanation it is clear that the storage register 40 can be arranged to register a digit corresponding to the number of negative impulses applied to the storage register. For example, in the illustrative example, the single negative digit pulse 22 applied to the storage register 40 will change the remanent magnetic induction of the core 40' corresponding to the digit 0 from a positive remanent induction to a negative remanent induction and the output pulse produced from the $c$ winding from the core 40' will change the original negative remanent induction of the core 41 corresponding to the digit 1 to a positive remanent magnetic induction in a manner analogous to the effect of a negative shift impulse 22' described above.

At the lower end of the storage register 40 is connected an input conductor 13 which is in turn connected to a fixed contact 14 of a switch 15. The switch 15 has a movable contact 17 connected to the output conductor 16 of a second storage register 50.

In turn, the storage register 50 otherwise constituted like register 40 has an input conductor 61 at its other end which corresponds to the output conductor of a storage register 60. Similarly, it can be seen that the accumulator includes a plurality of storage registers 70–190 which are connected in series with each other to form a closed ring circuit. That is, one end of a storage register is connected to one end of an adjacent register while the other end of the same register is connected to an end of another adjacent register. Actually, the output winding $c$ of one of the storage registers is connected to the input winding $b$ of the next adjacent storage register. For example, in the storage register 60, the conductor 61 is connected to the output winding $c$ of the magnetic core corresponding to the digit 9 in the storage register. The other end of the conductor 61 is connected to the input winding $b$ in the storage register 50 of the magnetic member which corresponds to the digit zero. This arrangement is carried out for all of the storage registers.

It can be seen that one end of the storage register 40 is connected by means of an output conductor 51$a$ to the movable contact 52$a$ of a second switch 53$a$ which switch has contacts 54 and 56. The fixed contact 54 is connected to the conductor 57 which is connected to the $b$ winding of the magnetic core in the storage register 190 which corresponds to the digit zero.

The fixed contact 56 of the switch 53 is connected on a conductor 57′ which in turn is connected to two circuits. One circuit includes the conductor 58 which is connected to the "carry" magnetic core 59 and a conductor 62 which is connected back to the input $b$ of the magnetic core 40′ corresponding to the digit zero in the storage register 40. The "carry" member 59 as indicated in Fig. 3 is similar to one storage member of the register shown in Fig. 2, since it has a core 59′, an input winding 59″, and output winding 59‴ connected to an output conductor 63 which is connected to the input of the generator 20 and also has an $a$ winding $a_3$ one end of which is connected on a conductor 64 to a transfer impulse generator 65. The transfer impulse generator 65 has an output conductor 66 which is connected to the $a$ winding $a_4$ of a second carry member 67 (of the same type as that shown in Fig. 3) the other end of the windings $a_3$ and $a_4$ of carry members 59 and 67, respectively, being connected by a conductor 68 so that the $a$ windings of the carry members 59 and 67 are connected in series in a loop including the transfer impulse generator 65.

The carry member 67 is in turn connected by a conductor 69 and the conductor 71 to the fixed contact 72 of the switch 15. The conductor 69 is also connected to a conductor 73 which is connected back to the input of the first magnetic core of the storage register 50 which corresponds to the digit zero in the storage register 50.

Each of the storage registers 40–190 has ten magnetic members respectively representing the digits zero–nine. These storage registers have the $a_1$ windings thereof connected in series and connected to the shifting impulse generator 75. That is, the shifting generator 75 has an output conductor 76 connected to one end of the $a_1$ windings in the register 180. The other end of the series connected $a_1$ windings of the register 180 is connected to the end of the series connected $a_1$ windings of the storage register 170. In turn, all of the $a_1$ windings of the registers are connected in series until the other end of the $a_1$ windings of the storage register 190 is reached and this end is connected to the input conductor 77 of the shifting impulse generator.

It should be noted that only the storage registers 40 and 50 have two separate $a$ windings $a_1$ and $a_2$. The $a_1$ windings are connected in series with each other and in series with all of the other series connected $a_1$ windings of the other registers 60–190. As already explained hereinabove the $a_2$ windings of the registers 40 and 50 are respectively connected to the outputs of the generators 20 and 30.

The described circuits of Figure 1 are therefore arranged so that any shifting impulses produced in the shifting impulse generator 75 will be applied to all of the series connected $a_1$ windings of all of the storage registers 40–190. Each of the shifting impulses produced in the generator 75 will cause a one step change in the magnetic cores of the storage registers respectively corresponding to the digits zero-nine. That is, if negative shifting impulses are used, each negative shifting impulse will change the positive remanent magnetic induction of one of the cores in each of the storage registers to a negative remanent induction and cause this core to emit an output pulse for changing the next successive core from a negative remanent magnetic induction to a positive remanent magnetic inductor.

When the movable members of the switches 15 and 53$a$ are operated so that the movable member 52$a$ is in contact with the fixed contact 54 and the movable member 17 is in contact with the fixed contact 14, the outputs of all of the registers will be connected to the inputs of the next adjacent register. Accordingly, when a shifting impulse is applied from the shifting impulse generator 75 to all of the $a_1$ windings of the thus series connected registers and if, for instance, a magnetic core corresponding to the digit 9 in one of the registers is the core with the positive remanent magnetic induction, this core will emit an output impulse from its respective output winding $c$ which is applied to the input $b$ winding of the next adjacent register, namely to that of the magnetic core thereof corresponding to the digit zero. In this manner, the storage condition of each register can be transferred to the net register if a series of ten successive shifting impulses is produced in the shifting generator 75.

In operation, in the initial operating condition of the circuit all of the storage registers 40–190 are arranged without any stored digits therein so that all of the magnetic cores of these registers except the magnetic core corresponding to the digit zero will have a negative remanent magnetic cores induction. The magnetic cores corresponding to the digit zero will have a positive remanent magnetic induction.

The switches 15 and 53$a$ are arranged at the start of operation in the illustrated position so that the output conductor 16 of the storage register 50 is connected to the conductor 71 and the output conductor 51$a$ of the storage register 40 is connected to the conductor 57. The multiplication process is carried out in the multiplier 10. In the illustrative example the digits 9×9 are being multiplied with each other so that the partial product is 81. This produces a single negative impulse 22 at the output conductor 21 of the generator 20 corresponding to the right-hand component of the partial product 81 and also produces a series of eight negative impulses 32 on the output conductor 31 of the generator 30 corresponding to the lefthand component of the partial product 81.

The single negative impulse 22 applied to the $a_2$ windings of the register 40 shifts the positive magnetic remanent induction to the magnetic core corresponding to the digit 1. Similarly in the storage register 50 the eight successive impulses applied to the $a_2$ windings thereof shifts the positive magnetic remanent induction condition to the magnetic core corresponding to the digit eight.

At this point the storage register 40 is storing the digit 1 and storage register 50 is storing the digit 8. The movable members 17 and 52$a$ of the switches 15 and 53$a$ respectively are then moved to the other position wherein the movable member 17 is in contact with a fixed contact 14 and the movable member 52$a$ is in contact with a fixed contact 54. All of the output and input windings $c$ and $b$, respectively, of storage registers 40–190 are connected in series in a closed ring circuit. The shifting impulse generator 75 now emits a series of ten negative impulses which is applied to all of the $a_1$ windings of the storage registers 40–190. If no digit is stored in register 40, and the storage registers 60–180 have no digits stored therein at this moment, at the end of the ten shifting impulses these registers 60–180 will be returned to their initial condition. That is the ten shifting impulses will cause the positive remanent magnetic induction of the core corresponding to the digit zero to be shifted along each storage register and from the last core corresponding to the digit 9 thereof an output impulse will be produced on the tenth shifting impulse to change the magnetic core corresponding to the digit zero of the next following register back to the positive magnetic remanent induction.

However, since the register 40 originally had the digit 1 stored therein, at the end of the tenth shifting impulse this digit will have been transferred to the magnetic core corresponding to the digit 1 in the register 190. Similarly, the digit 8 stored in the register 50 will now be shifted by the ten steps to the magnetic core corresponding to the digit 8 in the register 40.

That is, after the first shifting impulse applied from the generator 75 the registers 60–190 will have the digit 1 registered therein. The register 50 will have the digit 9 registered therein and the register 40 will have the digit 2 registered therein. The digits will be shifted step by step by the following nine shift impulses until they are transferred to the next respectively successive storage register.

Accordingly, at the end of the ten shifting impulses, the registers 50–180 will have the digit zero stored therein, the register 40 will have the digit 8 stored therein and the register 190 will have the digit 1 stored therein. The switches 15 and 53*a* are then returned to the illustrated position so that the output conductor 51*a* on the register 40 is connected to the conductor 57 and the output conductor 16 of the register 50 is connected to the conductor 71. The multiplier 10 then carries out the multiplication of the next portion of the multi-order multiplicand which is being multiplied by the multiplier. This could be the multiplication of the digits $5 \times 9$ for example. With this multiplication, the partial product produced is 45 so that the right-hand component is 5 and the left-hand component of the partial product is 4.

Accordingly in response to the input signals on the input conductor 11 the generator 20 will generate a series of five successive negative impulses and the generator 30 in response to the input signal on the input conductor 12 will generate a series of four successive negative impulses. These input impulses will be applied to the $a_2$ windings of the registers 40 and 50 respectively. In the register 50, the four impulses will cause the digit 4 to be stored therein by shifting the positive remanent magnetic induction condition from the core corresponding to the digit zero to the core corresponding to the digit 4.

On the other hand in the register 40, the first negative impulse applied to the register will add the digit 1 to the stored digit 8 to produce a stored digit 9. The next successive negative digit impulse 22 will produce an output pulse from the core 49 corresponding to digit 9, which output pulse will be applied around the loop including the conductors 51*a* and 57' and 62 to the input *b* winding of the core 40' corresponding to the digit zero and store the digit zero therein. At the same time, this output impulse emitted from the core 49 corresponding to the digit 9 will be applied to the "carry" member 59 by means of the conductors 57' and 58.

The next three impulses applied to the $a_2$ winding of the register 40 will cause the digit three to be stored in the register 40. It should be noted that this is part of the total of eight plus five which equals thirteen. Since there are only ten digit indicating means in the decade storage register 40, only the digit 3 is registered and the "carry" member 59 is energized in a manner which will be explained subsequently.

After the input signals have been applied to the registers 40 and 50, the switches 15 and 53*a* are operated so that all the registers 40–190 are again connected in series in the closed ring series. The shifting generator 75 then produces the ten shifting impulses so that the above described process is repeated. At the end of this process the register 180 will have the digit 1 therein received from the register 190, the register 190 will have the digit 3 stored therein received from the register 40 and the register 40 will have the digit 4 registered therein, received from the register 50. At this instant, the transfer impulse generator 65 emits a negative impulse which is applied to the *a* windings $a_4$ and $a_3$ of the carry members 67 and 59, respectively. The carry member 59 for instance consists of a single magnetic core 59' as illustrated in Figure 3. The member 67 is of like structure. Each magnetic core is originally arranged with a negative magnetic remanent induction. Therefore if no "carry" impulse has been applied to either of the carry members from the registers 40 or 50, these cores of the carry members will remain with negative remanent magnetic induction. Accordingly, the negative impulses applied from the transfer impulse generator 65 will have no effect.

However, in the illustrative example, the carry member 59 has received an impulse from the register 40. This impulse is applied to the *b* input winding 59'' of the carry member 59 so that its negative remanent magnetic induction has been changed to a positive remanent magnetic induction. Therefore, when the transfer generator 65 emits a negative impulse and applies this impulse to the *a* windings $a_3$ and $a_4$ of the carry members 59 and 67, respectively, the carry member 59 will emit an output impulse from its *c* winding 59''' on the conductor 63 which is applied to the generator 20 and causes the same to emit a single negative impulse. This single negative impulse is applied to the $a_2$ windings of the register 40 and shifts the digit 4 stored therein to a digit 5.

It is clear that at this point the tens transfer has been properly carried out since the digit 1 has been added to the next i.e. the highest decimal order of the partial products stored in the accumulator. It is also clear that after the carry member 59 has received the transfer impulse, it is returning to its original magnetic remanent induction state.

The switches 53*a* and 15 are now returned to the illustrated positions and the apparatus is ready for the next output of the multiplier 10.

It can be seen that this process can be continued until the entire multiplication process is carried out. Each time that the left-hand and right-hand components of the partial product are introduced into the storage registers 40 and 50, the impulse shifting generator 75 produces a series of ten negative impulses to simultaneously shift each of the stored digits into the next successive storage register. In this manner an entire multi-order number stored in the series connected registers is simultaneously shifted.

After the tenth negative impulse is emitted from the shifting impulse generator 75, the transfer generator 65 produces a transfer impulse which is applied to the carry members 59 and 67. If either of the carry members has had an impulse applied thereto from its respective register, a tens transfer impulse will be added to its respective register, through an impulse applied to the respective generator 20, 30, so that the digits stored therein will have a digit 1 added thereto. In this manner the digits are added in their proper order so that the overall product of the multiplication product process can be provided automatically.

To carry out a large multiplication, an entire series of single multiplications to produce the single partial products are carried out in the manner hereinabove described and each time that the partial product components are registered, the multi-order number resulting is shifted in a direction of the arrow 81.

In order to provide the total result of the multiplication process, additional conventional equipment can be added to the illustrated circuit. The additional printing or totalizing equipment e.g. of the type described in the copending application Serial No. 585,866, now abandoned, can be connected to the magnetic core corresponding to the digit zero in each of the series connected registers. Then each time that a digit passes from one register into the next register, namely energizing the magnetic core corresponding to the digit zero, a printing or totalizing magnet is energized to add on an additional digit. In such an arrangement one printing magnet would be used for each decade. This is a distinct advantage over conventional methods wherein it is necessary to have a printing magnet for each digit. The printing magnets can operate mechanical indicating means through gears and similar devices.

To synchronize the entire accumulator apparatus so as to be sure that the various shifting and transferring impulses are properly oriented in time, a programing control switch 85 is provided. In addition, the switches 15 and 53*a* are not ordinary mechanical switches but are merely so illustrated for explaining the operation thereof. Actually the switches are electronic gate circuits which have two different conductive conditions for switching purposes. These gate circuits can have their conductive conditions changed by negative impulses applied thereto. One type of gate circuit which has been used is a magnetic gate circuit using transfluxors.

Accordingly, in order to synchronize the entire operation of the apparatus the programing control switch 85 emits a plurality of impulses. Actually the switch 85 can be arranged with a plurality of series connected magnetic cores in the manner shown in Figure 2. Enough cores are provided so that all of the required output impulses are produced. In the illustrated example using decade storage registers, twenty-three coils connected in series are provided. An initial impulse applied to the series connected cores will produce the required synchronization. This initial impulse applied to the core marked 1' of the programing control switch will produce an output impulse on the conductor 86 which is applied to the transfer impulse generator 65. At the same time the core marked 1' in the programing control switch 85 will produce an output impulse applied to the core marked 2' in the programing control switch causing this core in turn to produce a first output impulse which is applied on the output conductor 87 to the multiplier 10 to enable the signals produced by this multiplier to appear on the output conductors 11 and 12.

Similarly, the core 2' will produce an output impulse which is applied to the core 3' causing it in turn to produce its output impulse. It can be seen therefore that the cores 2'–11' of the programming control switch 85 will produce ten successive impulses after the impulse applied to the generator 65, which ten successive impulses are applied to the multiplier 10 and permitting a minimum of ten impulses to be emitted from the multiplier on its output conductors 11 and 12 during this time.

The output impulse emitted from the core marked 11' on the programming control switch 85 applies an impulse to the core marked 12' which produces an output impulse applied to the switches 15 and 53*a* thereby changing these gate circuit switches from the diagrammatically illustrated position (Fig. 1) to the position wherein all registers are connected in series in a closed ring circuit. The core 12' and the programming switch 85 also produces an output impulse which is applied to the core marked 13'. The next ten successive impulses produced by the cores 13'–22' respectively in series are applied via conductor 87' to the shifting impulse generator 75 causing it to produce the ten shifting impulses for shifting the entire multi-order number stored in the accumulator around a step equal to one decade in the direction indicated by the arrow 81 as described hereinabove.

The core 22' of the programming control switch 85 emits an output impulse which is applied to core marked 23'. The core 23' produces an output impulse that is applied to the gate switches 15 and 53*a* causing them to return to the diagrammatically illustrated position (Fig. 1). This last core marked 23' in the programming control switch 85 also produces the output impulse which is applied to the core marked 1' to again start the programming control of the entire apparatus. The transfer generator 65 is operated by the output impulse from the core marked 1' in proper sequence and the next ten impulses are used for applying the left-hand and right-hand components produced in the multiplier 10 to the registers 40 and 50.

This process is continued until the entire multiplication process is carried out. If it is desired to provide a result in printed or other indicating form, the additional members indicated hereinabove for producing such visual indication can be connected in circuit with the various decades in the accumulator as described above.

It is clear that while the present invention has been described with respect to storage registers using the decimal or decade system, it is equally possible to have the number of cores of each register arranged to comply with any system such as the binary system for example. It is also possible to use a plurality of shifting impulse generators rather than the single impulse generator 75. That is, it is clear that the generator 75 must provide output impulses having a sufficiently high enough amplitude to permit the operation of all of the *a* windings of the storage registers connected in series. If this is not possible, a plurality of impulse shifting generators may be used which all are properly synchronized with each other.

It can be seen that the entire accumulator includes in the closed ring circuits storage registers 40 and 50 which are used for computing and the remaining storage registers which are used merely for storing the shifted digits. That is, in the registers 40 and 50 the impulses applied to the $a_2$ windings thereof are added to any digits already stored in the registers 40 and 50.

A further advantage in the accumulator according to the present invention is that all of the storage registers are connected in series in a closed ring circuit. In this way, it is possible to have as many storage registers as there are orders in the multi-order number representing the final result.

The invention has been described using magnetic cores in the storage registers. These have the advantage that they can simultaneously store more than one digit. That is, when the digits are being shifted from one register to the next by the ten shifting impulses, it is possible for more than one of the magnetic cores to have a positive magnetic remanent induction. However, at the end of the ten shifting impulses, each of the registers will have only one digit stored therein. As has already been indicated hereinabove the use of decimal counter tubes for the registers is not feasible since the electronic counter tubes cannot indicate more than one digit simultaneously. However, this might be overcome by using intermediate storing devices between adjacent registers so that one of the digits can be stored in the intermediate storer and retransferred back to the counter tube after the shifting has been carried out. This would not add too great a cost since such intermediate registers would only be used in those registers which are used for computing namely registers 40 and 50.

It would also be possible to use electronic counter tubes in the series of registers if a second counter tube is used for each decimal order as an intermediate storing device. This requires however a doubling of the necessary electronic storage registers which is avoided by use of the present invention with magnetic cores. The accumulator incorporating the enclosed ring circuit principles of the present invention can be used with different types of computing apparatus for either subtraction, addition, multiplication or division. In the multiplication, different types of multiplication can be carried out. For example, if the multiplicand is a multi-order number having $n_1$ orders and the multiplier is a multi-order number having $n_2$ orders, the multiplication can be carried out by multiplying all of the digits of the multiplicand by the highest order digit in the multiplier in the direction from the highest order of the multiplicand to the lowest order thereof. If this is the case, after the partial product corresponding to the complete multiplication between the highest order digit of the multiplier and all of the digits of the multiplicand is carried out, it is then necessary for the second highest order digit of the multiplier to be multiplied by the digits of the multiplicand. Before this is done, the partial products already obtained and stored in the accumulator must be shifted the proper amounts so that the next partial products due to the second highest digit of the multiplier will add in the proper columns with the partial products already stored in the accumulator.

It should be noted that the multi-order number which corresponds to the partial product stored in the accumulator may be shifted in different directions by using different polarity pulses.

The computation can be carried out also by multiplying the lowest order digit in the multiplier by the digits in the multiplicand proceeding from the lowest order to the highest order. Different combinations of these types of multiplications can also be carried out with apparatus incorporated in the accumulator of the present invention since the multi-order number corresponding to the partial products stored in the accumulator may be properly shifted so that the decimal orders line up properly with the numbers to be added thereto for obtaining the final computed results.

It is possible to subtract or divide by using the components of numbers in accordance with well known digital computors as well as other conventional methods.

In order to avoid the possibility of having too many orders in the accumulator it is possible to provide one of the end storage registers such as the register 190 with apparatus which will prevent the addition of the highest order of the multi-order number to the lowest order of the multi-order number already stored in the accumulator. This register 190 can be provided with control means for preventing such overflow or extra addition or with means for indicating the fact that such addition will take place. In other words, if there are sixteen storage registers in all, the accumulator can store a sixteen order number. However, if an additional number were added to the number already stored in the accumulator, the highest order digit of the sixteen order number would tend to be added to the lowest order digit. The register 190 can provide control means for preventing this.

It will be understood that each of the elements described above, or two or more together, may also find a useful application in other types of computing apparatus differing from the types described above.

While the invention has been illustrated and described as embodied in an accumulator for digital computers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an accumulator for computing machines, in combination, a plurality of storage registers, each comprising a chain of magnetizable cores inductively interconnected and capable of magnetically storing digits in any one of said cores and of serially transferring in shifting steps such stored digits to consecutive cores thereof upon application of one shifting impulse for each desired shifting step; digit input means connected with said cores of at least one of said storage registers for storing therein digits by application of a number of input pulses corresponding to the particular digit; circuit means for connecting said storage registers in series in a closed ring circuit and including single connecting members respectively connecting the output of one register with the input of the next following one for serially transferring single digits simultaneously from each register to the next following one, respectively; and shifting impulse generator means connected with all of said registers for applying said shifting impulses thereto.

2. In an accumulator for computing machines, in combination, a plurality of storage registers, each comprising a chain of ten magnetizable cores inductively interconnected and capable of magnetically storing digits in any one of said cores and of serially transferring in shifting steps such stored digits to consecutive cores thereof upon application of one shifting impulse for each desired shifting step, each of said cores respectively corresponding to the digits 0–9 of the decimal system; digit input means connected with said cores of at least one of said storage registers for storing therein digits by application of a number of input pulses corresponding to the particular digit; circuit means for connecting said storage registers in series in a closed ring circuit and including single connecting members respectively connecting the output of one register with the input of the next following one for serially transferring single digits simultaneously from each register to the next following one, respectively; and single shifting impulse generator means connected with all of said registers for applying said shifting impulses thereto.

3. In an accumulator for computing machines, in combination, a plurality of storage registers, each comprising a chain of ten magnetizable cores inductively interconnected and capable of magnetically storing digits in any one of said cores and of serially transferring in shifting steps such stored digits to consecutive cores thereof upon application of one shifting impulse for each desired shifting step, each of said cores respectively corresponding to the digits 0–9 of the decimal system; digit input means connected with said cores of at least one of said storage registers for storing therein digits by application of a number of input pulses corresponding to the particular digit; circuit means for connecting said storage registers in series in a closed ring circuit and including single connecting members respectively connecting the output of one register with the input of the next following one for serially transferring single digits simultaneously from each register to the next following one, respectively; and single shifting impulse generator means connected with all of said registers for applying a series of ten shifting impulses thereto.

4. In an accumulator for computing machines, in combination, a plurality of storage registers, each comprising a chain of magnetizable cores, an input coil and an output coil being carried by each of said cores, the output coil of each core being in circuit with the input coil of the next following core whereby said cores are inductively interconnected, said chain being capable of magnetically storing digits in any one of said cores by inductive change of its magnetized condition, a shifting coil being respectively carried by each of said cores and said shifting coils of all of said cores being connected in series for serially transferring in shifting steps such stored digits to consecutive cores thereof upon application of one shifting impulse to said series-connected shifting coils for each desired shifting step; digit input means connected with said cores of at least one of said storage registers for storing therein digits by application of a number of input pulses corresponding to the particular digit; circuit means for connecting said storage registers in series in a closed ring circuit and including single connecting members respectively connecting the output of one register with the input of the next following one for serially transferring single digits simultaneously from each register to the next following one, respectively; and shifting impulse generator means connected with all of said shifting coils of said registers for applying said shifting impulses thereto.

5. In an accumulator for computing machines, in combination, a plurality of storage registers, each comprising a chain of ten magnetizable cores, an input coil and an output coil being carried by each of said cores, the output coil of each core being in circuit with the input coil of the next following core whereby said cores are inductively interconnected, said chain being capable of magnetically storing digits in any one of said cores by inductive change of its magnetized condition, a shifting coil being respectively carried by each of said cores and said shifting coils of all of said cores being connected in series for serially transferring in shifting steps such stored digits to consecutive cores thereof upon application of one shifting impulse to said series-connected shifting coils for each desired shifting step, each of said cores respectively corresponding to the digits 0–9 of the decimal system; digit input means connected with said cores of at least one of said storage registers for storing therein digits by application of a number of input pulses corresponding to the particular digit, circuit means for connecting said storage registers in series in a closed ring circuit and including single connecting members respectively connecting the output of one register with the input of the next following one for serially transferring single digits simultaneously from each register to the next following one, respectively; and shifting impulse generator means connected with all of said shifting coils of said registers for applying a series of ten shifting impulses thereto.

6. An accumulator as claimed in claim 5, including, in at least one main register of said storage registers a digit input coil being respectively carried by each of said cores thereof, said digit input coils of said main register being connected in series with each other; said digit input means being connected with said series-connected digit input coils of said main register; and second circuit means and switch-over means connected with said main storage register for connecting, in one position of said switch-over means, said input and output coils of the first and last cores of said main register in series with said series-connected output and input coils of the other ones of said storage registers, and for connecting, in a second position of said switch-over means, the last output coil of said main register in series with the first input coil thereof, whereby those of said digit input pulses which would tend to increase the digit values stored in said main register to a value larger than "nine" are re-applied to the first core of said main register.

7. An accumulator as claimed in claim 5, including, in two main registers of said storage registers a digit input coil being respectively carried by each of said cores thereof, said digit input coils of said main registers, respectively, being connected in series with each other; said digit input means being connected with said series-connected digit input coils of said main registers, respectively, for storing therein digits by application of first digit pulses to one of said two main storage registers and a number of second digit pulses to the other one of said two main registers, the number of said first and second digit pulses corresponding to the particular digits; and second circuit means and first and second switch-over means connected with said two main storage registers, respectively, for connecting, in one position of said switch-over means, said input and output coils of the first and last cores, respectively, of said two main storage registers, respectively, in series with said series-connected output and input coils of the other ones of said storage registers, and for connecting, in a second position of said switch-over means, the last output coil of said one of said main storage registers in series with the first input coil thereof, and the last output coil of the other one of said main registers with the first input coil thereof, whereby those of said first and second digit input pulses, respectively, which would tend to increase the digit values stored in said two main storage registers, respectively, to a value larger than "nine" are re-applied to the respective first core of said two main storage registers, respectively.

8. In an accumulator for computing machines, in combination, a plurality of storage registers, each comprising a chain of magnetizable cores, an input coil and an output coil being carried by each of said cores, the output coil of each core being in circuit with the input coil of the next following core whereby said cores are inductively interconnected, said chain being capable of magnetically storing digits in any one of said cores by inductive change of its magnetized condition, a shifting coil being respectively carried by each of said cores and said shifting coils of all of said cores being connected in series for serially transferring in shifting steps such stored digits to consecutive cores thereof upon application of one shifting impulse to said series-connected shifting coils for each desired shifting step, in at least one of said storage registers a digit input coil being respectively carried by each of said cores thereof, said digit input coils of said register being connected in series with each other; digit input means connected with said series-connected digit input coils of said one of said storage registers for storing therein digits by application of a number of input pulses corresponding to the particular digit; circuit means for connecting said storage registers in series in a closed ring circuit and including single connecting members respectively connecting the output of one register with the input of the next following one for serially transferring single digits simultaneously from each register to the next following one, respectively; and shifting impulse generator means connected with all of said shifting coils of said registers for applying said shifting impulses thereto.

9. In an accumulator for computing machines, in combination, a plurality of storage registers, each comprising a chain of magnetizable cores, an input coil and an output coil being carried by each of said cores, the output coil of each core being in circuit with the input coil of the next following core whereby said cores are inductively interconnected, said chain being capable of magnetically storing digits in any one of said cores by inductive change of its magnetized condition, a shifting coil being respectively carried by each of said cores and said shifting coils of all of said cores being connected in series for serially transferring in shifting steps such stored digits to consecutive cores thereof upon application of one shifting impulse to said series-connected shifting coils for each desired shifting step, in two main registers of said storage registers a digit input coil being respectively carried by each of said cores thereof, said digit input coils of each of said main registers, respectively, being connected in series with each other; digit input means including electronic multiplier means for producing first digit pulses representing right-hand component elements of a product, and second digit pulses representing left-hand component elements of such product, said multiplier means having first and second output means for said first and second digit pulses respectively connected with said series-connected digit input coils of said two main registers for storing therein digits by application of a number of said first digit pulses to one of said two main registers and of said second digit pulses to the other one of said two main registers, the number of said first and second digit pulses corresponding to the particular digit; circuit means for connecting said storage registers in series in a closed ring circuit and including single connecting members respectively connecting the output of one register with the input of the next following one for serially transferring single digits simultaneously from each register to the next following one, respectively; and shifting impulse generator means connected with all of said shifting coils of said registers for applying said shifting impulses thereto.

10. In an accumulator for computing machines, in combination, a plurality of storage registers, each comprising a chain of ten magnetizable cores, and input coil and an output coil being carried by each of said cores, the output coil of each core being in circuit with the input coil of the next following core whereby said cores are inductively interconnected, said chain being capable of magnetically storing digits in any one of said cores by inductive change of its magnetized condition, a shifting coil being respectively carried by each of said cores and said shifting coils of all of said cores being connected in series for serially transferring in shifting steps such stored digits to consecutive cores thereof upon application of one shifting impulse to said series-connected shifting coils for each desired shifting step, each of said cores respectively corresponding to the digits 0–9 of the decimal system, in two main registers of said storage registers a digit input coil being respectively carried by each of said cores thereof, said digit input coils of each of said main registers, respectively, being connected in series with each other; digit input means including electronic multiplier means for producing first digit pulses representing right-hand component elements of a product, and second digit pulses representing left-hand component elements of such product, said mutiplier means having first and second output means for said first and second digit pulses respectively connected with said series-connected digit input coils of said two main registers for storing therein digits by application of a number of said first digit pulses to one of said two main registers and of said second digit pulses to the other one of said two main registers, the number of said first and second digit pulses corresponding to the particular digit; circuit means for connecting said storage registers in series in a closed ring circuit and including single connecting members respectively connecting the output of one register with the input of the next following one for serially transferring single digits simultaneously from each register to the next following one, respectively; and shifting impulse generator means connected with all of said shifting coils of said registers for applying a series of ten shifting impulses thereto.

11. An accumulator as claimed in claim 10, including circuit means and first and second switch-over means connected with said two main registers, for connecting, in one position of said switch-over means, said input and output coils of the first and last cores, respectively, of said main registers in series with said series-connected output and input coils of the other ones of said storage registers, and for connecting, in a second position of said switch-over means, the last output coil of said one of said main registers in series with the first input coil thereof, and the last output coil of the other one of said main registers in series with the first input coil thereof, whereby those of said first and second digit impulses, respectively, which would tend to increase the digit values stored in said main registers to a value larger than "nine" are re-applied to the respective first cores of said main registers.

12. An accumulator as claimed in claim 11, including first and second carry-over means respectively connected in circuit with said circuit means connecting, in said second position of said switch-over means, the last output coils and first input coils of said two main registers, respectively, and second circuit means connecting said first and second carry-over means with said multiplier means, for applying, whenever a carry-over digit pulse is applied from said main registers to said carry-over means, a corresponding carry-over digit pulse to said multiplier means and for thereby causing the latter to apply a corresponding carry-over digit pulse to the respective one of said two main registers, and transfer generator means in circuit with said first and second carry-over means for applying a transfer pulse to the latter for causing the same to emit said carry-over pulse whenever a carry-over pulse has been previously applied to said carry-over means from at least one of said main registers.

13. An accumulator as claimed in claim 12, wherein each of said carry-over means includes a magnetizable core, a first input coil thereon in circuit with said the respective one of said switch-over means when the latter is in said second position, for receiving carry-over pulses, a second input coil carried by said core and in circuit with said transfer generator means for receiving said transfer pulses, and an output coil carried by said core and connected to said second circuit means for delivering a carry-over pulse to said multiplier means.

14. An accumulator as claimed in claim 12, wherein said digit input means include programming control means having output means operatively connected with said multiplier means, shifting impulse generator means, transfer generator means and switch-over means, and having an input means for receiving an initial impulse, said programming control means being capable of delivering, upon receiving said initial impulse, a predetermined sequence of control pulses to said multiplier means, shifting impulse generator means, transfer generator means and switch-over means for timing their respective operations, said multiplier means, shifting impulse generator means, transfer generator means and switch-over means being responsive to said control pulses so as to deliver said digit impulses, said shifting impulses and transfer pulses and to change between said first and second positions, respectively, in synchronism with receipt of said control pulses.

References Cited in the file of this patent

UNITED STATES PATENTS

| | | |
|---|---|---|
| 2,585,630 | Crosman | Feb. 12, 1952 |
| 2,604,262 | Phelps et al. | July 22, 1952 |
| 2,778,006 | Guterman | Jan. 15, 1957 |
| 2,781,446 | Eckert et al. | Feb. 12, 1957 |

OTHER REFERENCES

Harvard Report II, Synthesis of Electronic Computing and Control Circuits, Staff of Computational Laboratory, Cambridge, Mass. (May 1951), pp. 198 to 200 relied on.

Description of a Magnetic Drum Calculator by the staff of the Harvard University Computation Laboratory, Harvard University Press, Cambridge, Mass., 1952, page 29.

Lyman: A Predetermined Scaler Utilizing Transistors and Magnetic Cores, Proceedings of the National Electronics Conference (Oct. 3–5, 1955), vol. XI, pps. 859–869.